United States Patent
Oh et al.

(10) Patent No.: US 8,817,820 B2
(45) Date of Patent: Aug. 26, 2014

(54) SYSTEM FOR CONTROLLING PATH MAXIMUM TRANSMISSION UNIT BY DETECTING REPETITIONAL IP PACKET FRAGMENTATION AND METHOD THEREOF

(75) Inventors: Seung-hun Oh, Gwangju-si (KR); Il-kyun Park, Seoul (KR); Byung-tak Lee, Suwon-si (KR); Kyung-hun Kim, Gwangju-si (KR); Jai-sang Koh, Gwangju-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 265 days.

(21) Appl. No.: 13/131,847

(22) PCT Filed: Jul. 17, 2009

(86) PCT No.: PCT/KR2009/003972
§ 371 (c)(1),
(2), (4) Date: May 27, 2011

(87) PCT Pub. No.: WO2010/062020
PCT Pub. Date: Jun. 3, 2010

(65) Prior Publication Data
US 2011/0243138 A1    Oct. 6, 2011

(30) Foreign Application Priority Data

Nov. 28, 2008  (KR) .................. 10-2008-0119464

(51) Int. Cl.
*H04J 3/00*  (2006.01)

(52) U.S. Cl.
USPC ............................ 370/476; 370/473; 370/474

(58) Field of Classification Search
None
See application file for complete search history.

(56) References Cited

U.S. PATENT DOCUMENTS

| | | | | |
|---|---|---|---|---|
| 5,341,375 | A * | 8/1994 | Buchholz et al. | 370/349 |
| 6,934,288 | B2 * | 8/2005 | Dempo | 370/394 |
| 7,738,495 | B2 * | 6/2010 | Dalal et al. | 370/476 |
| 7,792,031 | B2 * | 9/2010 | Krishnan et al. | 370/230.1 |
| 7,978,681 | B2 * | 7/2011 | Chung et al. | 370/351 |
| 7,995,478 | B2 * | 8/2011 | Takeda et al. | 370/235 |
| 8,284,802 | B2 * | 10/2012 | Huang et al. | 370/474 |
| 8,325,717 | B2 * | 12/2012 | Kumar | 370/389 |
| 2002/0051466 | A1 * | 5/2002 | Bruckman | 370/474 |
| 2003/0076850 | A1 | 4/2003 | Jason | |
| 2003/0188015 | A1 | 10/2003 | Lee et al. | |
| 2005/0058131 | A1 | 3/2005 | Samuels et al. | |
| 2005/0281288 | A1 | 12/2005 | Banerjee et al. | |
| 2009/0067429 | A1 * | 3/2009 | Nagai et al. | 370/392 |
| 2009/0232162 | A1 * | 9/2009 | Morimura et al. | 370/476 |

FOREIGN PATENT DOCUMENTS

KR    2003-0078590 A    10/2003
KR    10-2005-0015588     2/2005

OTHER PUBLICATIONS

Matthew Luckie et al., "Inferring and Debugging Path MTU Discovery Failures", Internet Measurement Conference 2005.

* cited by examiner

*Primary Examiner* — Michael J Moore, Jr.
(74) *Attorney, Agent, or Firm* — Rabin & Berdo, P.C.

(57) ABSTRACT

A fragmentation repetition detection apparatus (410) for detecting an IP fragmentation repetition which may occur in a multicast or unicast environment is provided. The fragmentation repetition detection apparatus (410) includes a packet capturing unit (411) which captures a received packet, a fragmentation repetition detector which detects whether or not the captured packet is a packet which is repetitively fragmented, and a path maximum transmission unit (PMTU) transmitter (414) which transmits PMTU information acquired by the fragmentation repetition detector (412) to a server which transmits the packet when the captured packet is a packet which is repetitively fragmented. Since a packet is transmitted by readjusting a PMTU, a fragmentation of an IP packet can be prevented.

17 Claims, 7 Drawing Sheets

1stPkt_Frag:State in Which First Packet Which Undergoes IP Fragmentation Is Received
LstPkt_Frag:State in Which Last Fragmented Packet Is Received After First Packet Which Undergoes IP Fragmentation Is Received
Dup_Frag:State in Which IP Fragmentation Repetition Is Detected

SYSTEM FOR CONTROLLING PATH MAXIMUM TRANSMISSION UNIT BY DETECTING REPETITIONAL IP PACKET FRAGMENTATION AND METHOD THEREOF

TECHNICAL FIELD

The present invention relates to packet communication, and more particularly, to a technique for preventing an IP packet fragmentation repetition which may occur in a multicast environment.

BACKGROUND ART

In end-to-end communication, for the sake of efficient communication, the smallest number of packets need to be transmitted, and thus packets with the largest packet size which can be supported in an end-to-end path need to be transmitted. The smallest one among maximum transmission units (MTUs) which can be supported in each link on a network path is referred to as a path MTU (PMTU). An IP packet transmission server transmits packets according to a PMTU to thereby transmit the smallest number of packets while avoiding an IP packet fragmentation.

In an Internet protocol version 4 (IPv4) unicast method, a PMTU can be detected using a traditional technique (RFC1063) established by the Internet engineering task force (IETF) in which an error message "Packet Too Big (PTB)" of an Internet control message protocol (ICMP) is used. However, a network operator and a network service provider currently do not support the ICMP due to a network security problem. Therefore, a method using the ICMP cannot actually be used.

A tool which detects a PMTU discovery failure, searches for a PMTU using a probe packet and ICMP feedback information and finds a PMTU discovery failure point was suggested by Matthew Luckie et al. in "Inferring and Debugging Path MTU Discovery Failures", Internet Measurement Conference 2005 (IMC2005). However, this tool does not consider the multicast environment.

Recently, the IETF established a standard (RFC 4821) in which a PMTU is discovered by transmitting a probe packet to a network through a packetization layer such as a transmission control protocol (TCP). However, this standard mentioned the multicast environment but did not suggest a concrete technique.

DISCLOSURE OF INVENTION

Technical Problem

It is an object of the present invention to provide a fragmentation repetition detection apparatus, a path MTU control apparatus, and a path MTU control method based on detection of a packet fragmentation repetition in which an IP packet fragmentation repetition which may occur in the multicast environment is prevented, thereby preventing a packet loss which deteriorates an application service.

Technical Solution

According to an aspect, there is provided a fragmentation repetition detection apparatus, including a packet capturing unit which captures a received packet, a fragmentation repetition detector which detects whether or not the captured packet is a packet which is repetitively fragmented, and a path maximum transmission unit (PMTU) transmitter which transmits PMTU information acquired by the fragmentation repetition detector to a server which transmits the packet when the captured packet is a packet which is repetitively fragmented.

The packet capturing unit may capture the received packet in a data link layer.

The fragmentation repetition detector may detect whether the captured packet is a packet which is repetitively fragmented using information included in an IP header of the captured packet.

The PMTU information transmitter may transmit the PMTU information to the server which transmits the packet using a port number which is previously designated.

According to another aspect, there is provided a path maximum transmission unit (PMTU) control apparatus installed in a server which transmits service traffic, including a PMTU information receiver which receives PMTU information from an apparatus which receives a packet transmitted from the server and detects a fragmentation repetition of the packet, and a PMTU information application unit which applies the largest size of a packet to be transmitted according to the received PMTU information to traffic to be transmitted from the server.

The PMTU information receiver may receive PMTU information through a port number which is previously designated.

The PMTU information application unit may apply the received PMTU information to a data link layer to control a unit of a packet to be transmitted.

According to yet another aspect, there is provided a path maximum transmission unit (PMTU) control method based on detection of a fragmentation repetition which is performed in an apparatus which is installed in an access network to receive a packet transmitted from a server, including capturing a received packet, detecting whether or not the captured packet is a packet which is repetitively fragmented, and transmitting PMTU information acquired in the detecting of whether or not the captured packet is a packet which is repetitively fragmented to a server which transmits the packet when the captured packet is a packet which is repetitively fragmented.

Additional features of the invention will be set forth in the description which follows, and in part will be apparent from the description, or may be learned by practice of the invention.

Advantageous Effects

According to exemplary embodiments of the present invention, there is an effect of preventing a packet loss and improving service quality by detecting an IP packet fragmentation repetition which may occur in the multicast environment and applying a new PMTU value. This effect can be achieved in the unicasting environment as well as the multicast environment.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

MODE FOR THE INVENTION

Figure 1:
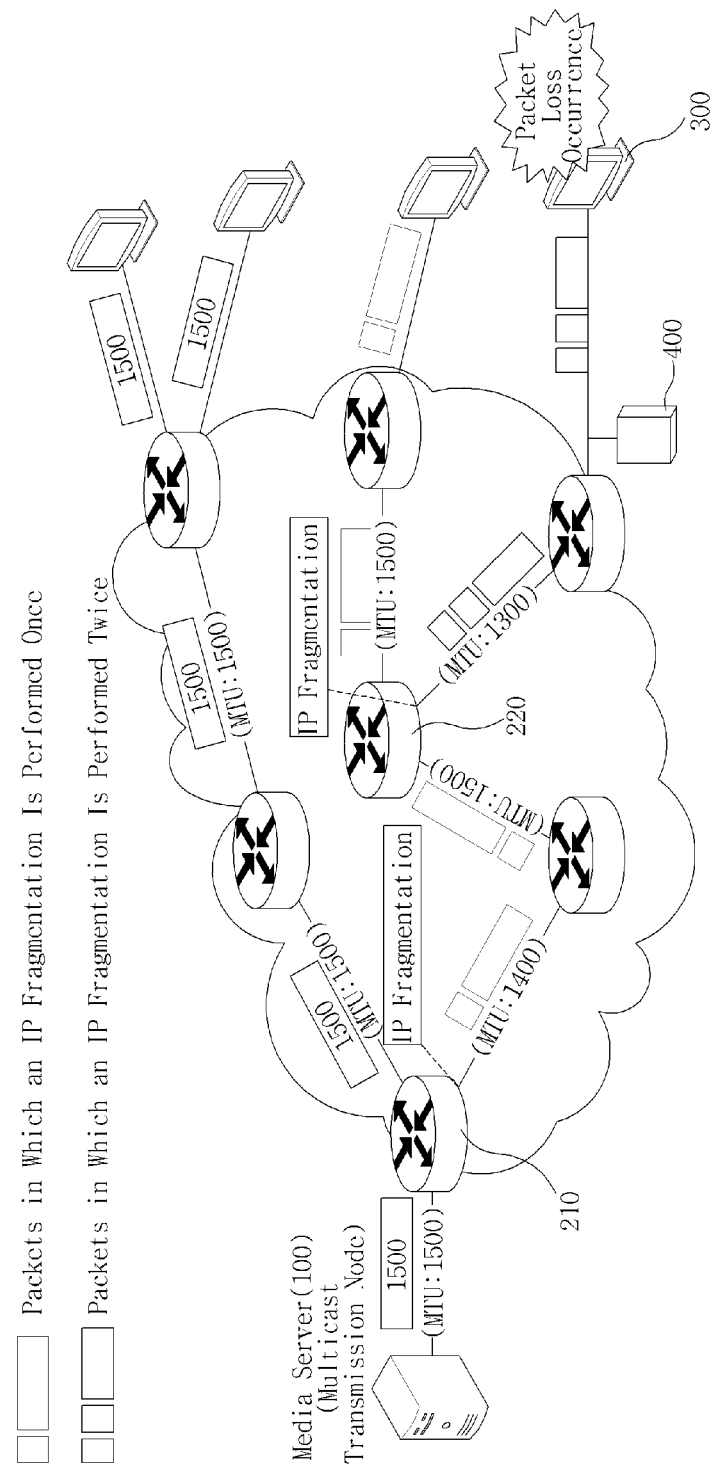
FIG. 1 is a schematic diagram illustrating a network configuration in which an IP packet fragmentation repetition occurs and a PMTU discovery procedure according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being on or connected to another element or layer, it can be directly on or directly connected to the other element or layer, or intervening elements or layers may be present. In contrast, when an element is referred to as being directly on or directly connected to another element or layer, there are no intervening elements or layers present.

FIG. 1 is a schematic diagram illustrating a network configuration in which an IP packet fragmentation repetition occurs and a PMTU discovery procedure according to an exemplary embodiment of the present invention.

FIG. 1 illustrates an example of a network in which an IP packet fragmentation (hereinafter, "IP fragmentation") repetition may occur and a situation in which a packet loss occurs in the multicast environment. A media traffic packet transmitted from a media server 100 is transmitted in units of 1,500 bytes which is a MTU value. The transmitted media traffic packet undergoes a first IP fragmentation in a first router 210. At this time, the media traffic packet is fragmented into packets of units of a maximum of 1,400 bytes and transmitted to the next node. Then, the fragmented packets undergo a second IP fragmentation in a second router 220. At this time, each fragmented packet is fragmented into packets of units of 1,300 bytes and transmitted to the next node. Therefore, packets are received in a client terminal 300 with a packet loss.

As described above, in the network environment of FIG. 1, links which may perform an IP fragmentation twice exist in the middle of the network, and so and an IP fragmentation repetition occurs. An IP fragmentation is commonly performed based on a MTU value of an output link of each router, and it may be alternatively performed by including data in a packet in a middle box during end-to-end communication. For example, in several IPTV digital right management (DRM) systems, an IPTV stream is encoded in real time in a middle box, and information necessary for decoding may be included in an IPTV stream. At this time, a packet which is larger in size than a MTU of an output interface of a middle box which performs encoding may be generated, and in this case, an IP fragment is performed. Meanwhile, reference numeral 400 in FIG. 1 is not described above but will be described later.

Figure 2:
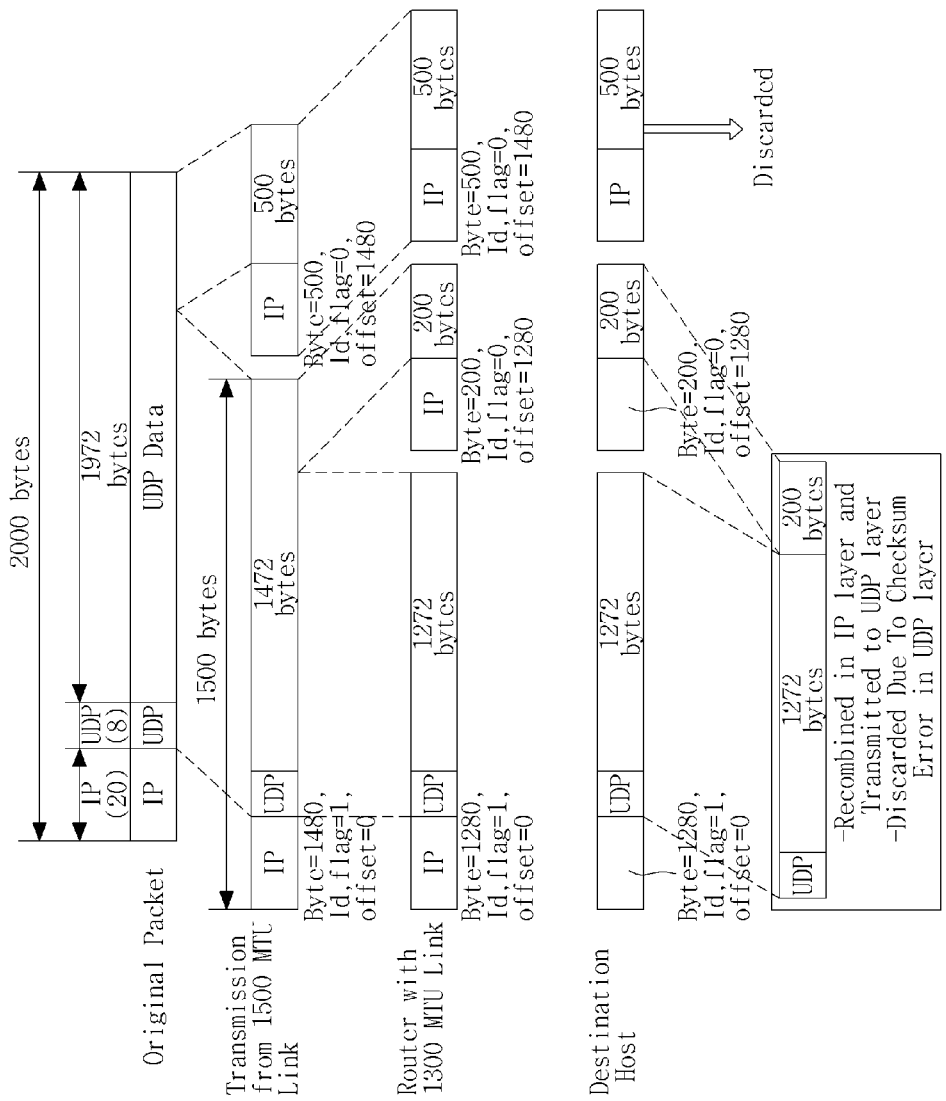
FIG. 2 is a view illustrating a packet fragmentation process and a packet loss which occurs due to an IP fragment repetition.

FIG. 2 is a view illustrating a packet loss which occurs due to an IP fragment repetition.

As shown in FIG. 2, an original packet is repetitively fragmented according to a MTU, and each fragmented packet is transmitted to a destination host. An IP layer of the destination host recombines fragmented packets and transfers a recombined packet to a UDP layer, and the UDP layer computes a checksum and then finally transfers the recombined packet to an application program. At this time, in the process of computing a checksum through the UDP layer, second-fragmented packets are discarded due to a checksum error, leading to a packet loss.

Figure 3:
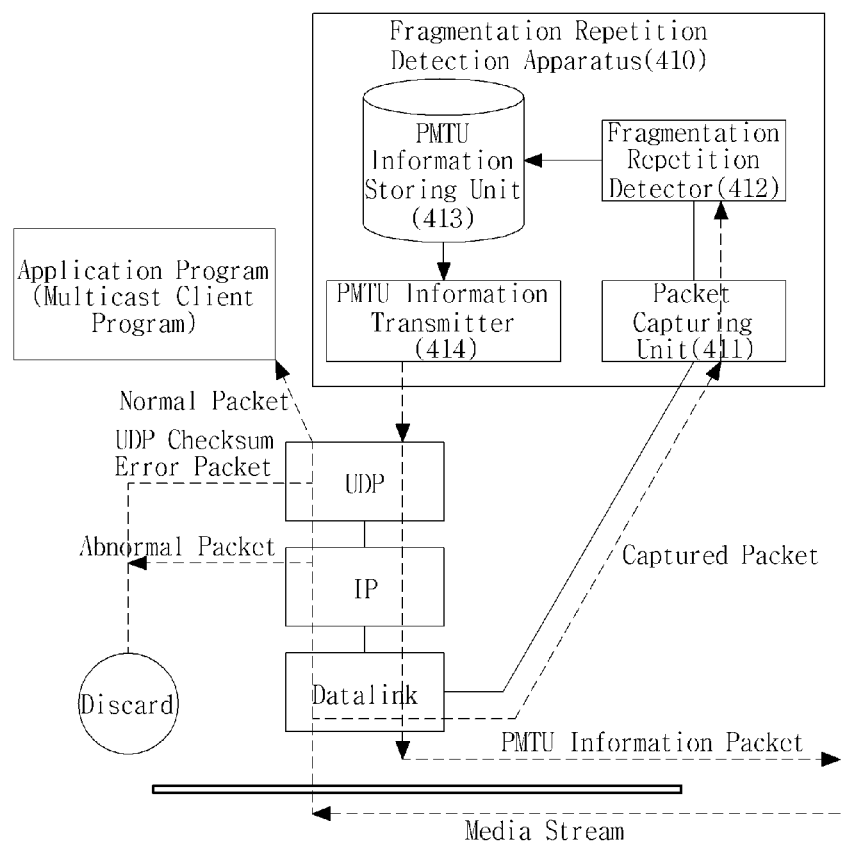
FIG. 3 is a block diagram of an IPTV quality measurement apparatus including a fragmentation repetition detection apparatus according to an exemplary embodiment of the present invention.

FIG. 3 is a block diagram of an IPTV quality measurement apparatus including a fragmentation repetition detection apparatus according to an exemplary embodiment of the present invention. The fragmentation repetition detection apparatus detects whether or not an IP fragmentation is repetitively performed for media traffic received by the IPTV quality measurement apparatus.

The IPTV quality measurement apparatus 400 including the fragmentation repetition detection apparatus 410 is preferably disposed on a network, for example, an access network, as shown in FIG. 1. Here, the fragmentation repetition detection apparatus 410 is implemented in the IPTV quality measurement apparatus 400, but it may be implemented in a general traffic monitoring apparatus or a client terminal 300 which finally receives media traffic.

Figure 4:
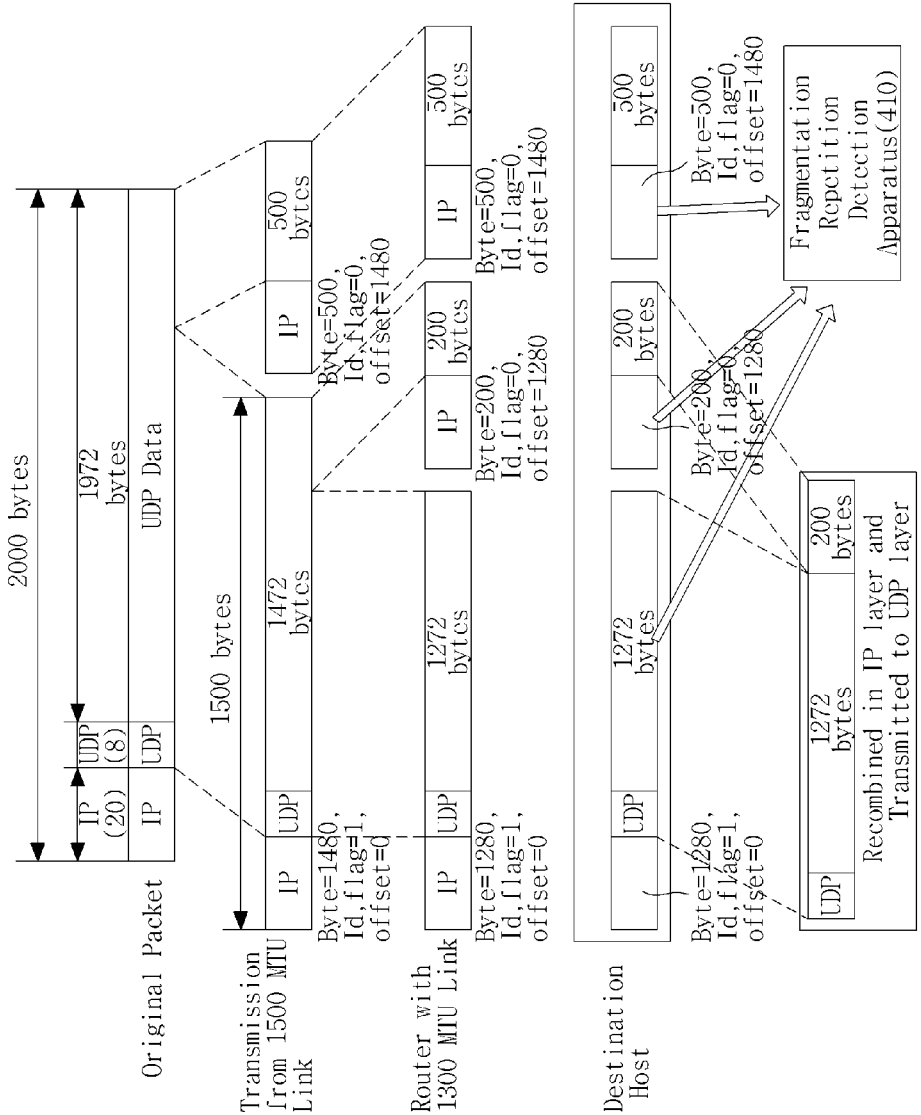
FIG. 4 illustrates a pattern of a packet which is captured to detect an IP fragmentation repetition.

The fragmentation repetition detection apparatus 410 includes a packet capturing unit 411, a fragmentation repetition detector 412, a PMTU information storing unit 413, and a PMTU information transmitter 414. The packet capturing unit 411 captures a packet which is received in the IPTV quality measurement apparatus 400. Preferably, the packet capturing unit 411 captures a packet which is received in a data link layer. In media traffic, some of packets in which an IP fragmentation is performed twice or more are discarded due to an error in an error check process of a UDP layer, and some packets are regarded as abnormal packets and discarded in an IP layer. For this reason, the packet capturing unit 411 preferably captures packets in the data link layer before some of received packets are discarded. Packets captured in the data link layer are illustrated in FIG. 4.

The packet capturing unit 411 transfers captured packets to the fragmentation repetition detector 412. At this time, the packet capturing unit 411 may transfer desired packets to the fragmentation repetition detector 412 through filtering. For example, packets which belong to a predetermined IP address band may be filtered.

The fragmentation repetition detector 412 detects whether or not packets transferred from the packet capturing unit 411 are packets in which an IP fragmentation is repetitively performed. Here, the fragmentation repetition detector 412 may detect whether or not packets transferred from the packet capturing unit 411 are packets in which an IP fragmentation is repetitively performed using a header length, a total length, an identification, a flag, or offset information. The fragmentation repetition detector 412 acquires PMTU information in the process of detecting an IP fragmentation repetition and stores the acquired PMTU information in the PMTU information storing unit 413. At this time, source address information among information included in an IP header is preferably stored in the PMTU information storing unit 413 together with PMTU information. After storing PMTU information in the PMTU information storing unit 413, the fragmentation repetition detector 412 transfers an event for requesting transmission of PMTU information to the PMTU information transmitter 414. A concrete algorithm of detecting an IP fragmentation repetition and acquiring PMTU information through the fragmentation repetition detector 412 will be described later.

The PMTU information transmitter 414 which receives the event transmits PMTU information stored in the PMTU information storing unit 413 to the media server 100 which has transmitted a media traffic packet. Since source address information of the media server 100 is stored in the PMTU information transmitter 414 together with PMTU information, the PMTU information transmitter 414 transmits PMTU information to the media server 100 using the source address information. The PMTU information transmitter 414 may transmit PMTU information to the media server 100 using a port number which is previously designated.

The media server 100 receives the PMTU information transmitted from the IPTV quality measurement apparatus 400 and applies the received PMTU information to a packet transmission system, so that a packet loss resulting from an IP fragmentation repetition can be prevented.

Meanwhile, the IPTV quality measurement apparatus 400 is disposed in an access network into which service traffic flows to measure a plurality of service sessions and thus preferably designed in view of an extension.

Figure 5:
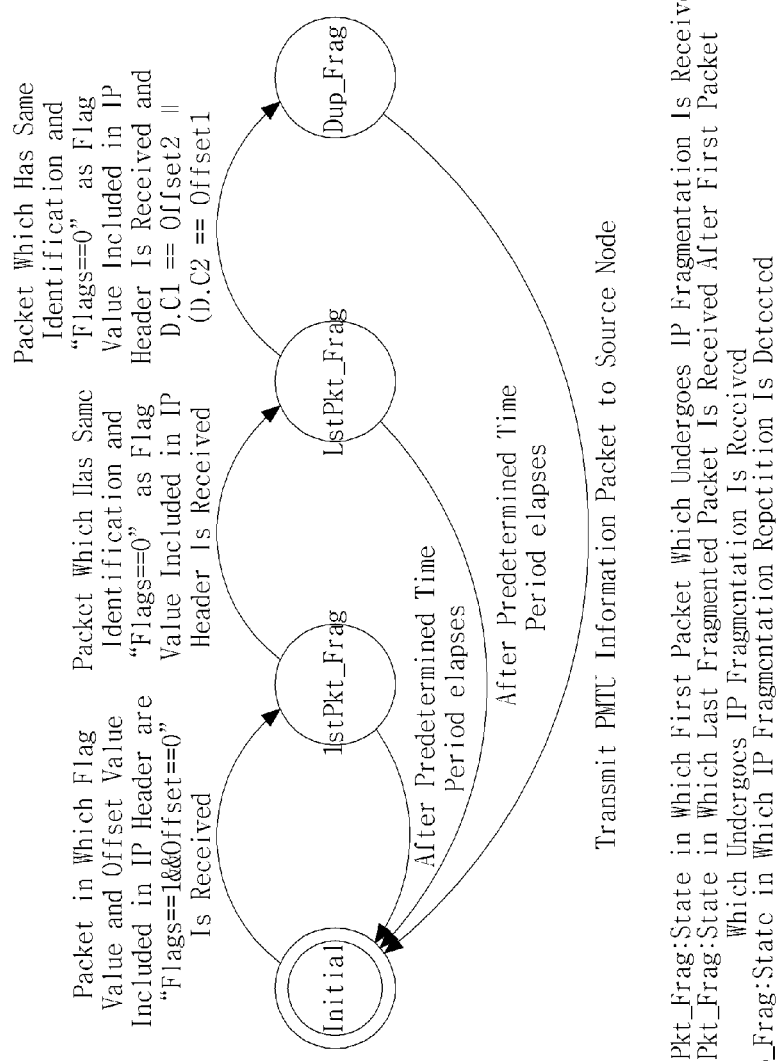
FIG. 5 is a diagram of a state transition necessary for detecting an IP fragmentation repetition.

FIG. 5 is a diagram of a state transition necessary for detecting an IP fragmentation repetition through the fragmentation repetition detector 412 of FIG. 3.

A received packet is managed according to an IP identification. In an initial state, when a first packet which undergoes an IP fragmentation is received, that is, when a packet in which a flag value and an offset value included in an IP header are "Flags==1 && Offset==0" is received, it transits to a "1stPkt_Frag" state. Here, the "1stPkt_Frag" state means a state in which a first packet which undergoes an IP fragmentation is received.

In the "1stPkt_Frag" state, when a last fragmented packet, that is, a packet which has the same identification and 0 as a flag value, is received, it transits to a "LstPkt_Frag" state, while when a last fragmented packet is not received during a predetermined time period, it transits to the initial state. Here, the "LstPkt_Frag" state means a state in which a last fragmented packet is received after a first packet which undergoes an IP fragmentation is received.

In "LstPkt_Frag" state, when a packet which represents a last fragmented packet, that is, a packet which has the same identification and 0 as a flag value, is received again, it transits to a "Dup_Frag" state if a condition of Equation 1 is satisfied. Here, the "Dup_Frag" state means a state in which an IP fragmentation repetition is detected.

$$(D.C_1 == Offset_2) \| (D.C_2 == Offset_1) \quad \text{Equation 1}$$

It is determined whether or not $D.C_1$ is identical to $Offset_2$ or $D.C_2$ is identical to $Offsets_1$. Here, D.C stands for Detection Clue and means information necessary for detecting an IP fragmentation repetition. $D.C_1$ is a D.C value (a first value) computed from a packet received when it transits to the "LstPkt_Frag" state, and $Offset_1$ is a value obtained from a header thereof. $D.C_2$ is a D.C value (a second value) computed from a packet received when it transits to the "Dup_Frag" state, and $Offset_2$ is a value obtained from a header thereof. The D.C value may be computed as in Equation 2. In Equation 2, an "IP header length" value is multiplied by 4 to express an "IP header length" value read from a packet header in units of bytes. For example, in the case in which an "IP header length" is 20 bytes, a value read from a header is 5, which is multiplied by 4 to be expressed in units of bytes.

$$D.C = (Offset) + (total\ length) - (IP\ header\ length * 4) \quad \text{Equation 2.}$$

In the "Dup_Frag" state, an event for transmitting discovered PMTU information to a server is generated, and it transits to the initial state again.

In the present embodiment, it is determined whether or not a condition of $(D.C_1 == Offset_2) \| (D.C_2 == Offset_1)$ is satisfied as described above, but it may be determined whether or not a condition of $D.C_1 == Offset_2$ is satisfied. In Equation 1, the reason for additionally determining whether or not a condition of $D.C_1 == Offset_2$ is satisfied is to consider a packet order since a problem may occur in a packet order.

Also, the reason for determining whether or not a condition of $(D.C_1 == Offset_2) \| (D.C_2 == Offset_1)$ is satisfied is to prevent any contingency problem. For example, if it is assumed that an IP fragmentation is normally performed once and a second fragmented packet is copied on a path, an apparatus for detecting it may misjudge that an IP fragmentation is performed twice based on only an ID value and a flag value. In order to prevent such a problem, offset values are computed and compared.

Figure 6:
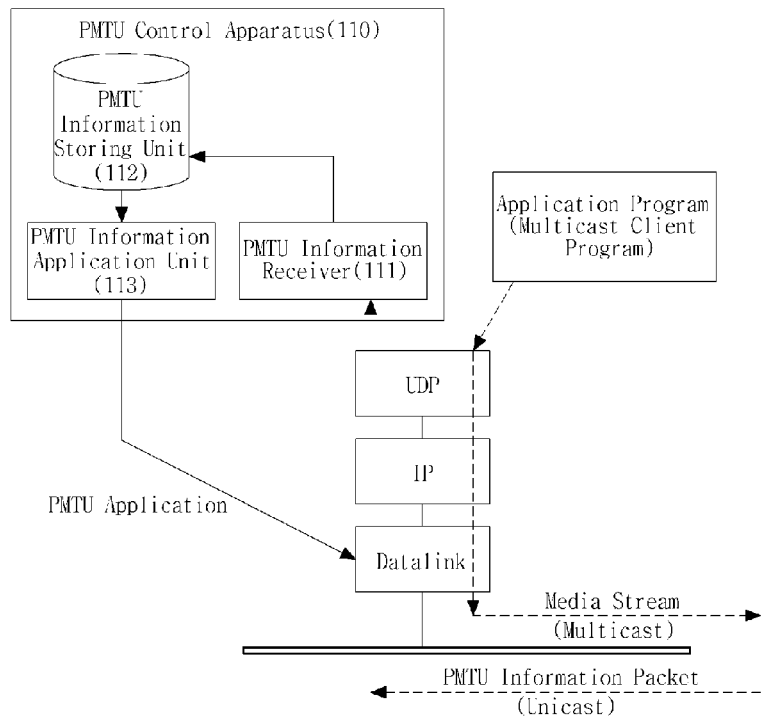
FIG. 6 is a block diagram of a media server including a PMTU control apparatus which applies PMTU information to a system according to an exemplary embodiment of the present invention.

FIG. 6 is a block diagram of the media server 100 including a PMTU control apparatus 110 which applies PMTU information to a system according to an exemplary embodiment of the present invention.

The PMTU control apparatus 110 includes a PMTU information receiver 111, a PMTU information storing unit 112, and a PMTU information application unit 113. An application program module independently transmits (unicasts or multicasts) service traffic, and the PMTU information receiver 111 receives PMTU information transmitted from the PMTU information transmitter 414 of the fragmentation repetition detection apparatus 410. Since a communication socket of a corresponding port number is used as described above, the PMTU information receiver 111 receives PMTU information through a communication socket of a corresponding port number. The PMTU information receiver 111 stores the received PMTU information in the PMTU information storing unit 112 and transmits an event for instructing that newly stored PMTU information be applied to service traffic to the PMTU information application unit 113.

The PMTU information application unit 113 which has received the event applies PMTU information newly stored in the PMTU information storing unit 112 to a system and controls a MTU of a service traffic packet to be transmitted by an application program module. For example, the PMTU information application unit 113 applies new PMTU information to the data link layer of the media server 100 and controls a MTU of a service traffic packet to be transmitted by an application program module.

Figure 7:
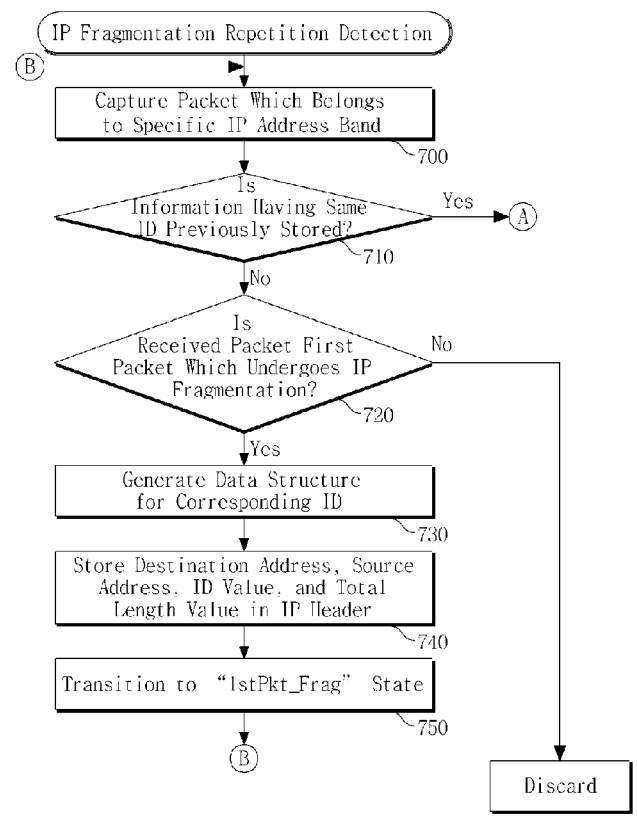
FIGS. 7 to 9 are flowcharts illustrating a procedure of detecting an IP fragmentation repetition.
Figure 8:
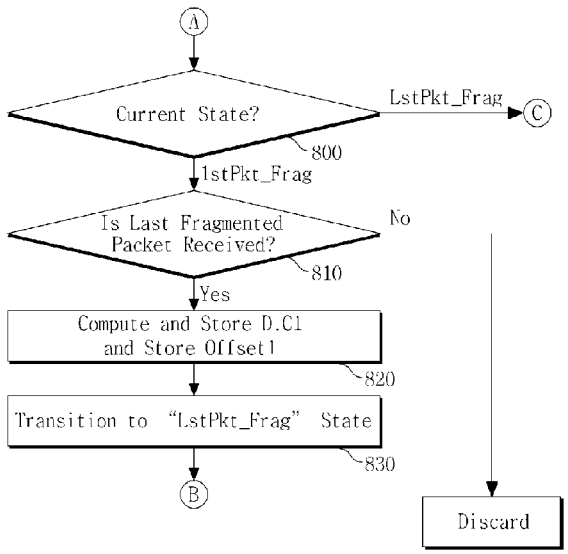
Figure 9:
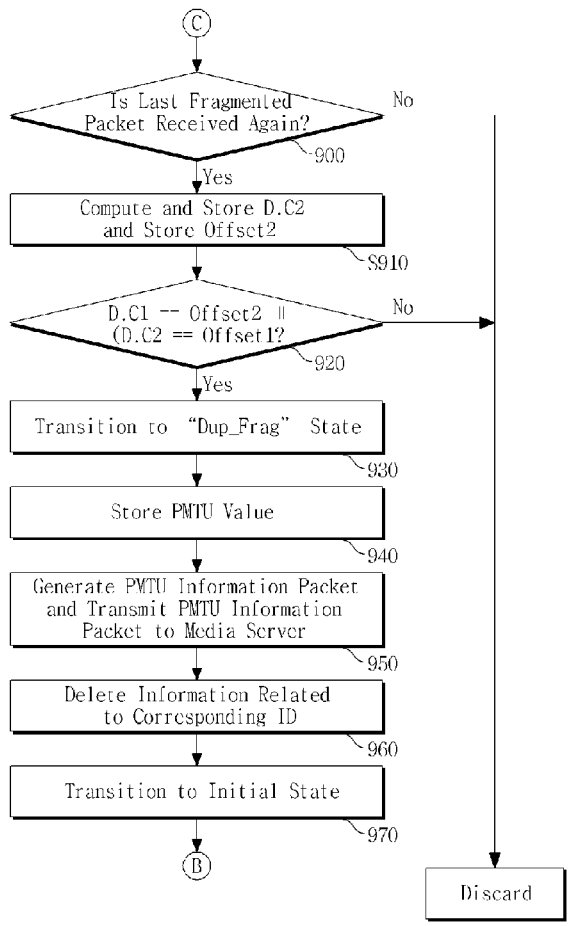

FIGS. 7 to 9 are flowcharts illustrating a procedure of detecting an IP fragmentation repetition through the fragmentation repetition detection apparatus 410.

A procedure of detecting an IP fragmentation repetition according to an exemplary embodiment of the present invention is initiated, and a received packet is captured in a data link layer. In one embodiment, the fragmentation repetition detection apparatus 410 captures only a packet which belongs to a specific IP address band (operation 700). Then, an identification value included in an IP header of the captured packet is investigated to determine whether or not it is an identification value which is previously registered (operation 710).

When it is determined in operation 710 that it is a new identification (ID), it is determined whether or not the received packet is a first packet which undergoes an IP fragmentation (operation 720). This process may be performed by determining whether or not a flag value and an offset value included in an IP header of the received packet satisfies "Flags==1 && Offset==0."

When a flag value and an offset value included in an IP header satisfies "Flags==1 && Offset==0," the fragmentation repetition detection apparatus 410 generates a data structure for a new ID (operation 730) and includes a destination address, a source address, an identification value, and a total length value which are included in the IP header of the packet in the data structure (operation 740). At this time, a state transits to the "1stPkt_Frag" state (operation 750).

Meanwhile, when it is determined in operation 710 that it is not a new identification, a current state is investigated (operation 800). When it is determined that the current state is the "1stPkt_Frag" state, it is determined whether or not a last fragmented packet is received (operation 810). That is, it is determined whether or not a flag value included in the IP header is "Flags==0." When a flag value included in the IP header is "Flags==0," a $D.C_1$ value is computed and stored, and an $Offset_1$ value included in the IP header is stored (operation 820). Then, a state transits to the "LstPkt_Frag" state (operation 830).

Meanwhile, when it is determined in operation 800 that the current state is the "LstPkt_Frag" state, it is determined whether or not a last fragmented packet is received again (operation 900). That is, it is determined whether or not a flag value included in the IP header is "Flags==0." When a flag value included in the IP header is "Flags==0," a $D.C_2$ value is computed and stored, and an $Offset_2$ value included in the IP header is stored (operation 910). Then, a relationship between values of $D.C_1$ and $Offset_1$ and values of $D.C_2$ and $Offset_2$ is investigated. For example, it is determined whether or not the $D.C_1$ value is identical to the $Offset_2$ value or the $D.C_2$ value is identical to the $Offset_1$ value (operation 920). At this time, a state transits to a "Dup_Frag" state (operation 930). When either of the two cases is satisfied, a PMTU value is stored (operation 940). A PMTU information packet including a PMTU value is generated and transmitted to the media server 100 (operation 950). Finally, all information generated for a corresponding identification is deleted (operation 960), and a state transits to the initial state (operation 970).

As described above, the present invention suggests a PMTU discovery technique of an in-band method in which a PMTU can be discovered from actual media traffic in view of the multicast environment in which a plurality of clients are present and it can be determined whether or not an IP fragmentation is repetitively performed in the process of discovering a PMTU rather than a PMTU discovery technique of an out-of-band method of using a separate probe packet.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A fragmentation repetition detection apparatus in a multicast environment, comprising:
 a packet capturing unit that captures a packet transmitted from a server;
 a fragmentation repetition detector that detects whether or not the captured packet has been repetitively fragmented in more than one router of the multicast environment, and acquires path maximum transmission unit (PMTU) information of the captured packet; and
 a PMTU transmitter that transmits the PMTU information acquired by the fragmentation repetition detector to the server when the captured packet is a repetitively-fragmented packet, wherein
 the fragmentation repetition detector performs the detection using information included in an IP header of the captured packet, and the fragmentation repetition detector is configured
  to check whether or not identification information of the captured packet is previously stored, and
   when the identification information of the captured packet is not previously stored, to check a flag value and an offset value included in the IP header of the packet to determine whether or not the packet is a first fragmented packet, and when the packet is the first fragmented packet, to record a state of an identification of the captured packet as a first fragmentation state,
   when the identification information of the captured packet is previously stored, to check whether the state of the identification is the first fragmentation state or a last fragmentation state, and
    when the state of the identification is the first fragmentation state, to check the flag value included in the IP header of the captured packet to determine whether or not the packet is a last fragmented packet, and when the packet is the last fragmented packet, to record the state of the identification as the last fragmentation state, and
    when the state of the identification is the last fragmentation state, to check the flag value included in the IP header of the captured packet to determine whether or not the packet is the last fragmented packet, and when the packet is the last fragmented packet, to record the state of the identification as a repetition fragmentation state and storing the PMTU information.

2. The fragmentation repetition detection apparatus of claim 1, wherein the packet capturing unit captures the packet in a data link layer.

3. The fragmentation repetition detection apparatus of claim 1, wherein the captured packet belongs to a specific IP address band.

4. The fragmentation repetition detection apparatus of claim 1, wherein the information includes a header length, a total length, an identification, a flag, or an offset.

5. The fragmentation repetition detection apparatus of claim 1, wherein
 the packet capturing unit receives a plurality of packets, and
 the PMTU information acquired by the fragmentation repetition detector for each of the packets is total length information of a first packet among ones of the plurality of packets having a same identification as that of said each of the packets.

6. The fragmentation repetition detection apparatus of claim 1, wherein the server transmits the packet using a port number that is previously designated.

7. The fragmentation repetition detection apparatus of claim 1, wherein the packet is a media traffic packet.

8. The fragmentation repetition detection apparatus of claim 1, wherein the fragmentation repetition detection apparatus is disposed in an access network.

9. A path maximum transmission unit (PMTU) control apparatus for use in a server transmitting service traffic in a multicast environment, comprising:
a PMTU information receiver configured to receive PMTU information from an apparatus that receives a packet transmitted from the server and detects whether or not the received packet has been repetitively fragmented in more than one router of the multicast environment; and
a PMTU information application unit that applies a largest size of packets to be transmitted according to the received PMTU information to the service traffic to be transmitted from the server, wherein
the PMTU information receiver performs the detection using information included in an IP header of the received packet, and the PMTU information receiver is configured
to check whether or not identification information of the received packet is previously stored, and
when the identification information of the received packet is not previously stored, to check a flag value and an offset value included in the IP header of the packet to determine whether or not the packet is a first fragmented packet, and when the packet is the first fragmented packet, to record a state of an identification of the received packet as a first fragmentation state,
when the identification information of the received packet is previously stored, to check whether the state of the identification is the first fragmentation state or a last fragmentation state, and
when the state of the identification is the first fragmentation state, to check the flag value included in the IP header of the received packet to determine whether or not the packet is a last fragmented packet, and when the packet is the last fragmented packet, to record the state of the identification as the last fragmentation state, and
when the state of the identification is the last fragmentation state, to check the flag value included in the IP header of the received packet to determine whether or not the packet is the last fragmented packet, and when the packet is the last fragmented packet, to record the state of the identification as a repetition fragmentation state and storing the PMTU information.

10. The PMTU control apparatus of claim 9, wherein the PMTU information receiver receives the PMTU information through a port number that is previously designated.

11. The PMTU control apparatus of claim 9, wherein the PMTU information application unit applies the received PMTU information to a data link layer to control a unit of a packet to be transmitted.

12. A path maximum transmission unit (PMTU) control method for an apparatus receiving a packet transmitted from a server in a multicast environment, comprising:
capturing the packet;
detecting whether or not the captured packet has been repetitively fragmented in more than one router of the multicast environment, including acquiring PMTU information of the captured packet; and
transmitting the acquired PMTU information to the server when the captured packet is a repetitively-fragmented packet,
wherein the detecting is performed using information included in an IP header of the captured packet, and
wherein the detecting includes checking whether or not identification information of the captured packet is previously stored;
when the identification information of the captured packet is not previously stored, checking a flag value and an offset value included in the IP header of the packet to determine whether or not the packet is a first fragmented packet, and when the packet is the first fragmented packet, recording a state of an identification of the captured packet as a first fragmentation state;
when the identification information of the captured packet is previously stored, checking whether the state of the identification is the first fragmentation state or a last fragmentation state;
when the state of the identification is the first fragmentation state, checking the flag value included in the IP header of the captured packet to determine whether or not the packet is a last fragmented packet, and when the packet is the last fragmented packet, recording the state of the identification as the last fragmentation state; and
when the state of the identification is the last fragmentation state, checking the flag value included in the IP header of the captured packet to determine whether or not the packet is the last fragmented packet, and when the packet is the last fragmented packet, recording the state of the identification as a repetition fragmentation state and storing the PMTU information.

13. The method of claim 12, wherein the capturing of the packet comprises capturing the packet in a data link layer.

14. The method of claim 12, wherein the recording of the state of the identification as the last fragmentation state comprises
recording the state of the identification as the last fragmentation state after storing a first value obtained by adding a total length to the offset value included in the IP header of the captured packet, and subtracting an IP header length value and the offset value in the first fragmentation state,
and the storing of the PMTU information comprises:
storing a second value obtained by adding the total length to the offset value included in the IP header of the captured packet and subtracting the IP header length value and the offset value in the first fragmentation state,
determining whether or not the first value is identical to the offset value stored in the last fragmentation state, and
when the first value is identical to the offset value stored in the last fragmentation state, recording the state of the identification as the repetition fragmentation state.

15. The method of claim 12, wherein the recording of the state of the identification as the last fragmentation state comprises
recording the state of the identification as the last fragmentation state after storing a first value obtained by adding a total length to the offset value included in the IP header of the captured packet and subtracting an IP header length value and the offset value in the first fragmentation state,
and the storing of the PMTU information comprises:
storing a second value obtained by adding a total length to the offset value included in the IP header of the captured packet and subtracting the IP header length value and the offset value in the first fragmentation state,
determining whether or not the first value is identical to the offset value stored in the last fragmentation state or the second value is identical to the offset value stored in the last fragmentation state, and when the first value is identical to the offset value stored in the last fragmentation state or the first value is identical to the offset value stored in the last fragmentation state, recording the state of the identification as the repetition fragmentation state.

16. The method of claim 12, wherein the PMTU information is a total length of a first packet among all packets having a same identification.

17. The method of claim 12, further comprising, deleting the identification of the captured packet and recorded information related to the identification after transmitting the PMTU information.

* * * * *